Sept. 13, 1966  C. P. CATO  3,272,298
MULTI-PATH FEED IN A CONVEYOR ASSEMBLY
Filed Feb. 5, 1964  3 Sheets-Sheet 1

INVENTOR.
CARL P. CATO
BY James and Franklin
ATTORNEYS

INVENTOR.
CARL P. CATO
BY James and Franklin
ATTORNEYS

United States Patent Office 3,272,298
Patented Sept. 13, 1966

3,272,298
MULTI-PATH FEED IN A CONVEYOR ASSEMBLY
Carl P. Cato, Lynchburg, Va., assignor to Dacam Corporation, Lynchburg, Va., a corporation of Virginia
Filed Feb. 5, 1964, Ser. No. 342,616
6 Claims. (Cl. 193—36)

The present invention relates to a conveyor assembly, and in particular to one in which a plurality of articles moving therealong are alternately guided into different exit or output paths.

Packaging and handling costs loom large in distribution activities. Particularly is this the case in the beverage and canning industries, where very large numbers of cases or cartons must be handled in as short a period of time as possible. Great efforts are made to produce bottling or canning and packaging equipment which can operate at as high a rate of speed as possible. The output units from such machines (usually filled cases or cartons) often require subsequent manipulation, and frequently the speed with which said output units can be manipulated, either manually or by machine, is less than the speed with which such output units can be produced by the primary machine. To slow down the primary machine because of a lack of facility in subsequent operations is most undesirable, not only because it reduces productivity but also because it represents a waste of the time and expense which has gone into the design and production of the high speed primary machine. Accordingly, it is often necessary to take the output units from the primary machine, which come from that machine in a substantially continuous moving output line, and divide those units into two or more separate feed lines, each of those separate feed lines therefore moving in a substantially continuous moving output line, from the primary machine. Thus one high speed primary machine can supply a plurality of feed lines for subsequent manipulation at comparatively low speeds.

Means must therefore be provided in the conveyor system for the units as they emanate from the primary machine to guide those units alternately into a plurality of different output lines. Various means have been provided in the past to accomplish this result, including the use of article guiding means in the primary line automatically shiftable in position so as to engage and guide successive units first to one output line and then to another. However, the nature of these prior art devices is such as to inherently require that there be an appreciable spacing between the units as they move toward the output lines, or that the units move at a relatively slow rate, or both. If the guiding or diverging device is not completely effective, so that a given article is not properly guided into the appropriate output line but instead becomes blocked in some intermediate position, the entire feed line is interrupted and, indeed, it may often is necessary to stop the operation of the primary machine before the blockage is cleared. Thus it will be appreciated that reliability in operation is exceedingly important in a device of the type under discussion.

It is the prime object of the present invention to devise a conveyor means which will, in a reliable and virtually fool-proof manner, act upon an input line of rapidly moving and closely spaced articles so as to alternately guide those articles into first and second output lines, and to accomplish this result independently of the rapidity with which the individual articles are fed thereto or the spacing between those articles. It is a particular characteristic of the device in question that the alternate feed of articles to the two output paths is reliably effected even if the articles are closely abutting one another, so that the input feed line thereof may be substantially continuous and unbroken, as is the case, for example, where force-feeding is employed.

I accomplish these objectives by utilizing a plurality of article guiding means at the diverging station where the articles are to be selectively guided first to one and then to the other of the output lines, the individual guiding means being spaced from one another in the direction of movement of the articles through the diverging station and being individually shiftable so as to be oriented toward one or another of the output lines. Means are provided for shifting the orientation of the guiding means from one output line to the other sequentially, the guiding means more remote from the output lines being shifted before the less remote guiding means is shifted. Thus, if two cartons are moving along the input line and the leading carton is directed by the guiding means into one of the output lines, the first guiding means (the one more remote from the output lines) may be shifted so as to be oriented toward the other output line as soon as the leading carton has cleared it, and while the leading carton is still being guided toward said one output line by the second guiding means. The first guiding means, when thus shifted, will engage the trailing carton and start it in its movement toward the other output line, and this while the leading carton is still not fully received in said one output line. When the leading carton clears the second guiding means, which will occur preferably when the leading carton has been properly guided into said one output line, the second guiding means will then be shifted so that it is oriented toward the other output line, and the trailing carton, already started in its proper direction by the first guiding means, will engage and be guided by the second guiding means, thereby reliably ensuring its proper entry into the second output line. Thus the use of a plurality of guiding means spaced from one another in the direction of movement of the articles to be conveyed and sequentially actuated between positions oriented toward one output line or the other ensures that the articles will be reliably fed in alternate fashion first to one output line and then to the other no matter how closely spaced those articles may be on the input line and even though the articles are moving exceedingly rapidly. The arrangement is such that divergence will be effected for slow speeds of article movement as well, and for articles which are spaced widely from one another in the input line, the assembly automatically accommodating itself to variations in speed and spacing without requiring any supervision.

A subsidiary object of the present invention is to devise a mechanism capable of accomplishing the above results which is simple, inexpensive and reliable. To this end the guiding means are shifted from one orientation to another by means of a positive mechanical linkage which is actuated by feeler means disposed in the output paths and adapted to be engaged by articles as they move along those paths. The normal operative position of the feelers is one in which they are in the path of an object as it moves along a given path, the object then moving the engaged feeler to an inoperative position. When the engaged feeler in a first output path is thus moved from operative to inoperative position, the positive mechanical linkage to which it is connected shifts the orientation of the guiding means associated therewith from said first output path to said second output path and at the same time moves the associated corresponding feeler in said second output path from its inoperative to its operative position, thus conditioning it to be engaged by an article guided into said second output path by the re-oriented guiding means. Thus there are two independent sets of positively linked and actuated elements, each set comprising a feeler in each of the output paths and a guiding means operatively connected thereto.

To the accomplishment of the above, and to such other objects as may hereinafter appear, the present invention relates to a conveyor assembly having means incorporated therein for alternately feeding objects to first one output path and then another, as defined in the appended claims and as described in this specification, taken together with the accompanying drawings, in which:

Figure 1:
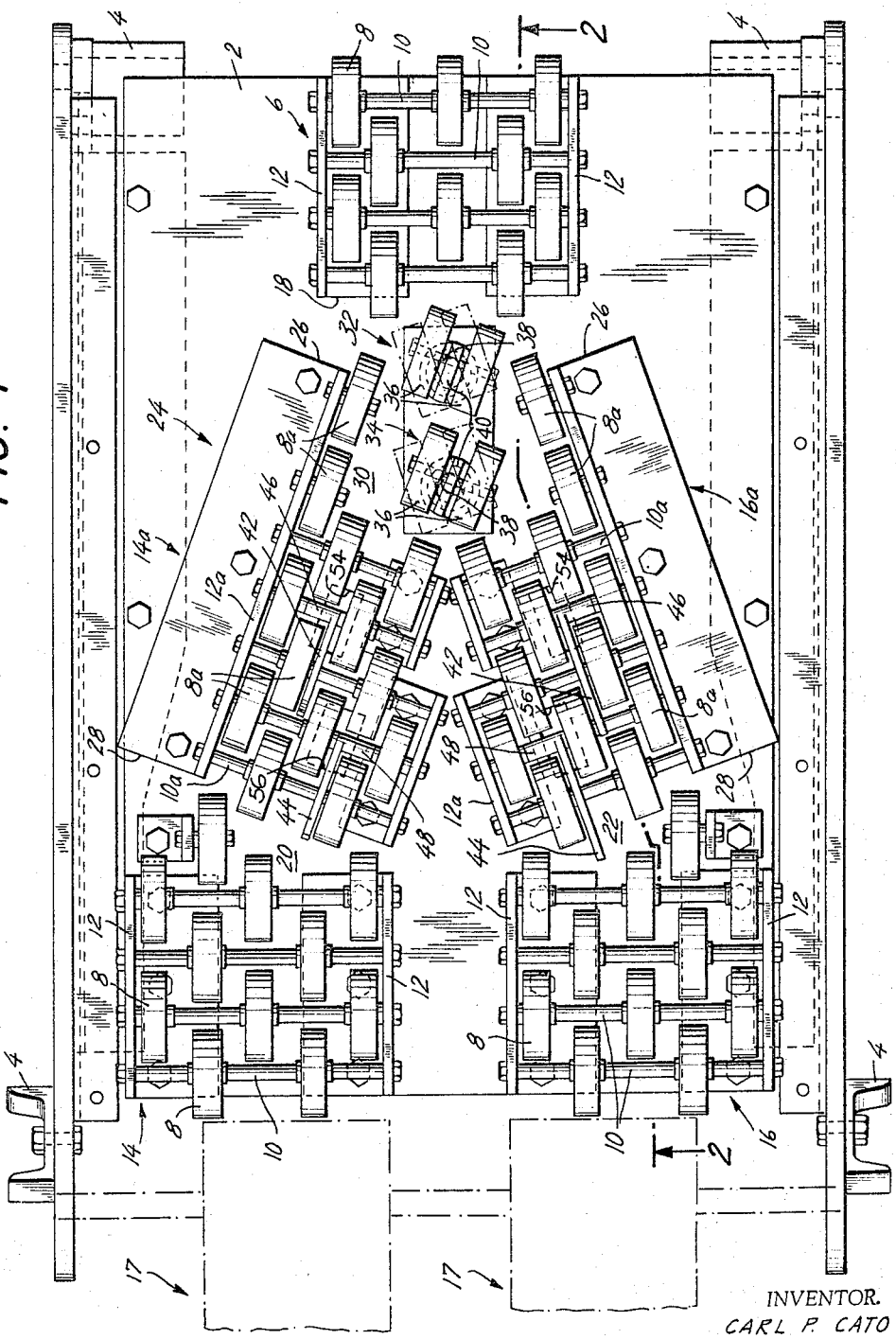
FIG. 1 is a top plan view of an embodiment of the present invention.

As here disclosed the invention is embodied in a conveyor section to which articles (such as cartons of cans or bottles) may be delivered and from which articles may be removed in any desired manner. Thus gravity feed, force feed, conveyor belt feed, or any other desired type of feed could be employed both for delivery and removal of the objects. Moreover, the invention is here specifically embodied in an assembly which is not self-powered, and which relies upon some external force, such as gravity or the force with which the objects are fed into the assembly, for causing those objects to pass through the assembly. It will be understood that if desired any appropriate means could be provided for power-moving the articles through the disclosed assembly without affecting the alternate diverging operation thereof, and the assembly could readily be adapted for use with widely varying sizes, styles and types of fed objects, e.g. individual bottles or cans, large crates, small boxes, and the like.

The assembly comprises a base plate 2 which may be supported in any appropriate manner, as by attaching legs (not shown) to the corner brackets 4. The right hand end of the plate 2, as viewed in the drawings, is the input end thereof and the left hand end is the output end thereof, and it is preferred, as indicated in FIG. 2, that the right hand or input end thereof be elevated relative to the left hand or output end thereof, so that the articles fed thereinto will pass from the input end to the output end under the influence of gravity, thereby eliminating any need for external power drive for the assembly.

At the right hand end of the support plate 2 there is a primary or input track portion generally designated 6 which may comprise a plurality of readily rotatable article supporting wheels 8 mounted on shafts 10 and located between lateral guide walls 12, the spacing between the guide walls preferably being somewhat greater than the width of the articles to be fed. At the left hand end of the support plate 2 are mounted first and second output track portions generally designated 14 and 16 respectively, the straight parallel sections of the output track portions 14 and 16 being laterally spaced from one another and each being constructed similarly to the input track portion 6 and comprising rotatable wheels 8 mounted on shafts 10 and located between upstanding guide walls 12.

Figure 2:
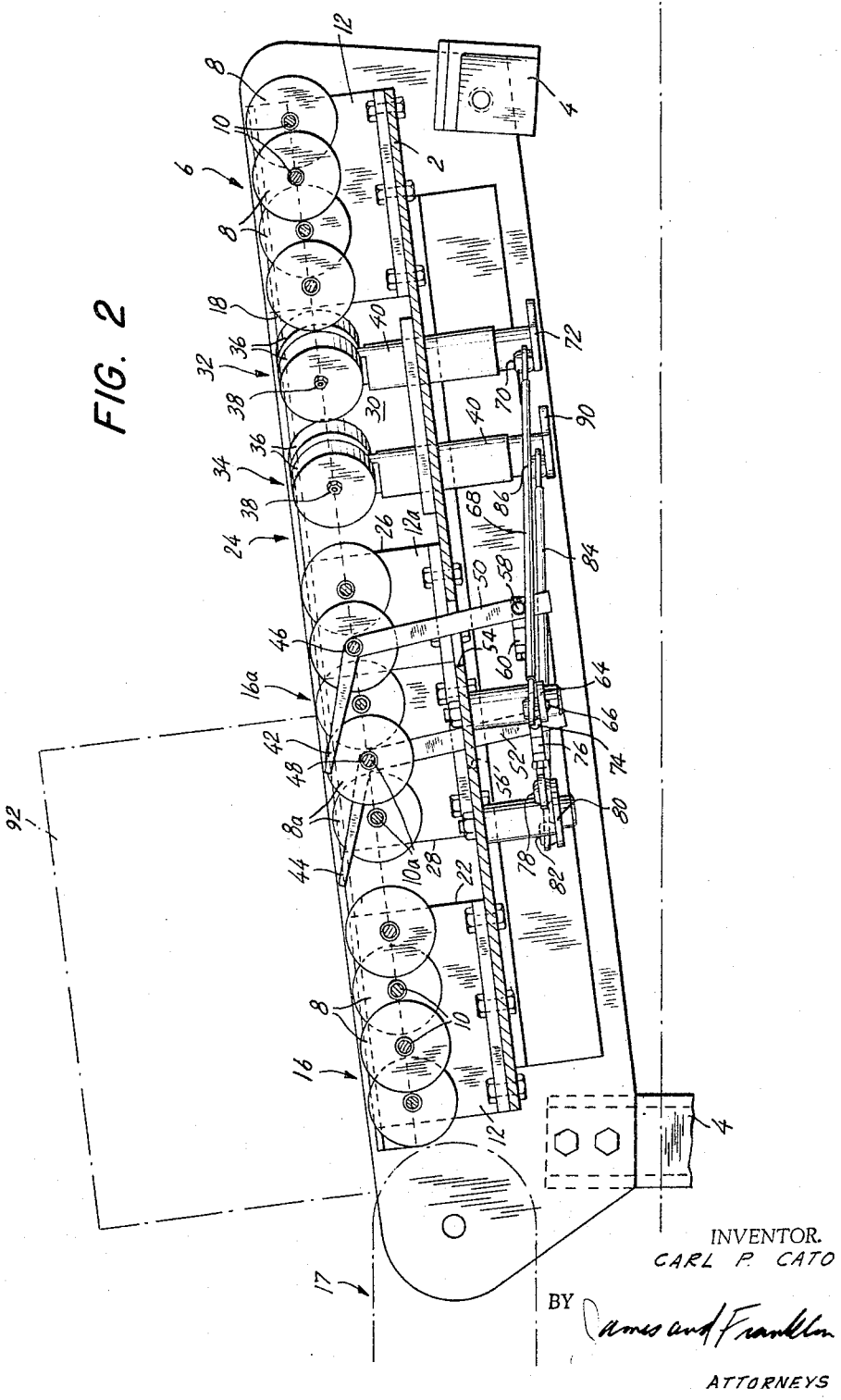
FIG. 2 is a side cross sectional view thereof, taken along the line 2—2 of FIG. 1.

The input track portion 6 begins at the right hand end of the support plate 2 and the output track portions 14 and 16 terminate at the left hand end of the support plate 2, and any appropriate external conveying means, such as the conveyor belts 17 schematically shown in FIGS. 1 and 2, can be associated with the input end of the input track portions 6 and/or the output ends of the first and second output track portions 14 and 16 for respectively delivering and removing articles from the assembly.

The output end of the input track portion 6 proper is designated by the numeral 18 and the input ends of the straight sections of the first and second output track portions 14 and 16 are designated by the numerals 20 and 22 respectively. The space between the ends 18, 20 and 22 constitutes a diverging station, and is generally designated by the numeral 24. This diverging station 24 is in line with, and may be considered a part of, the input track portion 6.

At the diverging station 24 there are a pair of article conveying sections 14a and 16a, each comprising a plurality of rotatable wheels 8a mounted on shafts 10a and located between upstanding guide walls 12a. Each of the sections 14a and 16a has an input end 26 located adjacent to and substantially in line with the output end 18 of the input track section proper 6 and an output end 28 located adjacent to and in line with the input ends 20 and 22 respectively of the straight sections of the output track portions 14 and 16 respectively, the sections 14a and 16a constituting parts of the output track portions 14 and 16 respectively, and diverging from the input track portion 6 to define a substantially Y-shaped track assembly at the diverging station 24.

A space, generally designated 30, is provided at the input ends 26 of the sections 14a and 16a and the output end 18 of the portion 6, generally in an area representing a longitudinal extension of the track sections 14a and 16a and the track portion 6, and first and second guiding means, generally designated 32 and 34 respectively, are mounted in that space 30. Each of these guiding means comprises a pair of readily rotatable wheels 36 mounted on horizontal shaft 38 which is in turn supported on a vertically extending member 40 which is rotatably mounted in and extends beneath the base plate 2, each of the guiding means 32 and 34 therefore being individually pivotable about a vertical axis so that the wheels 36 carried thereby may be oriented either parallel to the section 14a (as shown in solid lines in FIG. 1) or parallel to the section 16a (as shown in broken lines in FIG. 1). The wheels 36 may be slightly higher than the wheels 8 and 8a, or may be provided with a frictional article-engaging surface, or both, in order that they may better engage fed articles and thus perform their guiding function.

Figure 3:
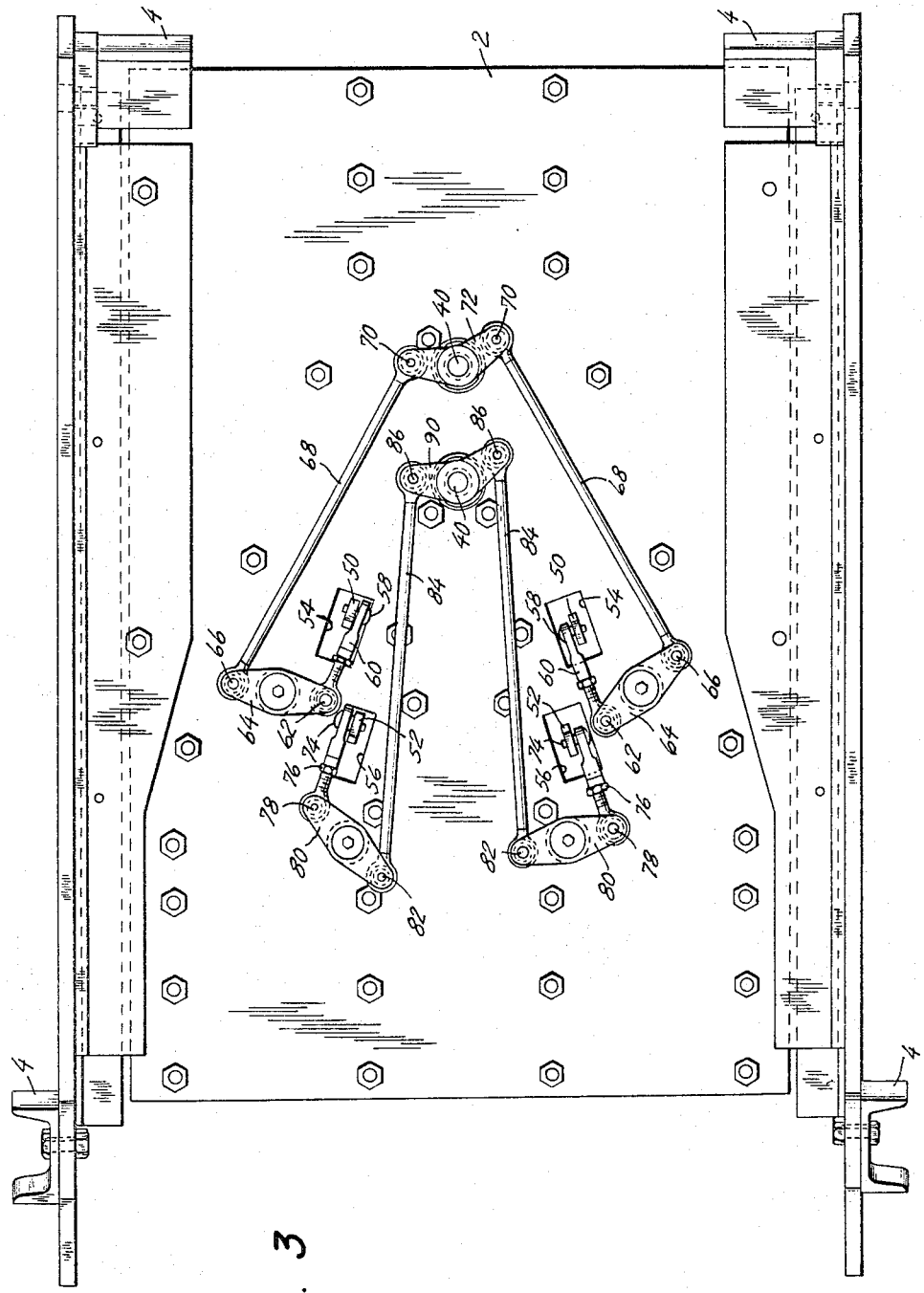
FIG. 3 is a bottom plan view of the assembly of FIG. 1.

A pair of feeler arms 42 and 44 are located in each of the sections 14a and 16a, each of these arms being mounted by means of collars 46 and 48 respectively on appropriate shafts 10a so as to be movable between operative and inoperative positions respectively extending up above the wheels 8a and extending down to a point no higher than the upper surfaces of the wheels 8a. Rigidly connected to the feelers 42 and 44 are arms 50 and 52 respectively, which arms extend through slots 54 and 56 respectively formed in the base plate 2 (see FIGS. 2 and 3). Each arm 50 connected to a feeler 42 is pivotally connected at 58 to a link 60 the other end of which is pivotally connected, at 62, to an arm 64 mounted in any appropriate manner on the underside of the base plate 2 so as to be pivotal about a vertical axis. The other end of the arm 64 is pivotally connected, at 66, to link 68. The other ends of the links 68 associated with each feeler 42 are pivotally connected, at 70, to opposite ends of crank arm 72 rigidly secured to the member 40 associated with the first guiding means 32. Similarly, each of the arms 52 connected to a feeler 44 is pivotally connected at 74 to a link 76 the other end of which is connected, at 78, to arm 80 mounted on the underside of the base plate 2 so as to pivot about a vertical axis. The other end of arm 80 is pivotally connected, at 82, to link 84. The other ends of the links 84 associated with each feeler 42 are pivotally connected, at 86, to opposite ends of crank arm 90 rigidly secured to the member 40 associated with the second guiding means 34. Thus both of the feelers 42 are rigidly mechanically connected to one another and to the first guiding means 32, and both of the feelers 44 are rigidly mechanically connected to one another and to the second guiding means 34. Each of these mechanical connections is so designed that when the feelers 42 and 44 in, for example, the track section 14a are raised to their operative position in which they extend above their associated wheels 8a, the feelers 42 and 44 in the other track section 16a are in their inoperative lowered position in which their tips are substantially at the same level as the upper portions of the wheels 8a associated therewith, and the first and second guiding means 32 and 34 associated respectively with the feelers 42 and 44 are oriented in line with the track section 14a, all as shown in solid lines in FIG. 1. It will be appreciated that when the upraised feeler 42 in the track section 14a is depressed, the first guiding means 32 will be shifted to its position shown in broken lines in FIG. 1, in which it is aligned with the track section 16a, and at the same time the feeler 42 in the track section 16a will be raised to its operative position. Similarly, depression of the feeler 44 in track section 14a will cause the second guiding means 34 to shift into alignment with the second track section 16a and will cause the corresponding feeler 44 in the track section 16a to rise. Proper functioning of the various linked elements is accomplished by adjusting the effective lengths of the link 60 and 76, and once that adjustment is made the assembly is ready for operation.

It will be noted that the spacing between the feelers 42 and 44 in each of the track sections 14a and 16a in the direction of movement of an article along those track sections is substantially the same as the spacing between the vertical axes of rotation of the guiding means 32 and 34 in the direction of movement of articles along the input track portion 6.

The functioning of the assembly of the present invention is as follows: Assume that the assembly initially is in the position shown in FIG. 1, with the guiding means 32 and 34 oriented toward the track section 14a, the feelers 42 and 44 in the track section 14a raised to operative position and the feelers 42 and 44 in the track section 16a depressed to inoperative position. As an article is delivered onto the input track portion 6 it will roll therealong until it engages the first guiding means 32. Its direction of movement will then be shifted by that guiding means 32 so as to be directed toward and into the track section 14a. As the article continues to move it will engage and will be further guided by the second guiding means 34, thus ensuring that it passes smoothly and accurately between the side walls 12a of the track section 14a. As the article moves along the track section 14a it will engage and depress the feeler 42. This will cause the first guiding means 32 to shift its position and become oriented toward the track section 16a. Preferably, this will not occur until the trailing edge of the first article has cleared the guiding means 32, the spacing between the various elements being appropriately coordinated with the size of the article being fed. As the article continues to move along track section 14a it will engage and depress the feeler 44 in that track section, thus shifting the orientation of the second guiding means 34 and bringing it into alignment with the track section 16a. Again, this preferably does not occur until the trailing end of the article has cleared the guiding means 34. As has previously been explained, when the guiding means 32 and 34 have their orientation shifted, the associated feelers 42 and 44 respectively in the track section 16a are simultaneously lifted to operative position. Thus the passage of an article through the track section 14a conditions the apparatus so that the next succeeding article is guided and directed by the means 32 and 34 into the track section 16a. FIG. 2 shows a carton 92 in the track portion 16 after it has engaged and depressed and is passing over the feelers 42 and 44 in the track section 16a. As each article comes to the output end 28 of the track section 14a or 16a it passes onto the straight section of the output track portion 14 or 16, as the case may be, from which it is removed in any appropriate manner.

The utility of the pair of individually and sequentially actuated guiding means 32 and 34 is most apparent when the articles fed into the input section 6 move rapidly and are in close juxtaposition, and even in contact with, to one another. Under such circumstances when the first article moves into the track section 14a, for example, and as soon as it has cleared the first guiding means 32, that guiding means is immediately shifted into alignment with the track section 16a, and hence the following article is promptly started toward the track section 16a, and this even before the first article has fully entered the track section 14a. As soon as the first article has cleared the second guiding means 34 it too is shifted into orientation with the track section 16a. At this point the first article is fully committed to its movement along the track section 14a to the straight section of the output track portion 14 and the second guiding means 34 is immediately made effective on the second article, already started on its way toward the track section 16a by the first guiding means 32, thereby to ensure that the second article is reliably guided into and through the track section 16a and the straight section of the output track portion 16.

It will be appreciated that the diverging and guiding action of the mechanism disclosed is thoroughly reliable, since it is accomplished by direct and simple mechanical connections, this constituting an important advantage of the device here disclosed. However, it will be understood that the provision of sequential actuation of a plurality of guiding means could be accomplished in other fashions, and even in more complex fashion, such as by the use of electrical sensing devices and electromagnetic actuating devices controlled thereby, without departing from the broader aspects of my invention.

While but a single embodiment of the present invention is here specifically disclosed, it will be appreciated that many variations may be made therein, all within the scope of the instant invention as defined in the following claims.

I claim:

1. A conveyor comprising an input track portion along which a succession of articles are adapted to pass, first and second output track portions communicating with said input track portion and extending along different paths from a diverging station on said input track portion, said articles being adapted to pass from said input track portion to one or the other of said output track portions, first and second article guiding means at said diverging station and spaced from one another in a direction generally toward said output track portions, said second guiding means being closer to said output track portions than is said first guiding means, each of said guiding means being adapted to be engaged by and to guide said articles as they pass from said input track portion to one of said output track portions and each being movable between first and second operative positions oriented toward said first and second output track portions respectively, thereby to guide said articles into the output track portion toward which they are oriented, and control means for said guiding means, said control means being effective first to shift said first guiding means from first operative position to second operative position or vice versa, and thereafter to correspondingly shift said second guiding means.

2. The conveyor of claim 1, in which said control means for said first and second guiding means comprises first and second feeler means in said first and second output track portions respectively, sequentially spaced therealong, and movable between operative and inoperative positions in which they are respectively in the path of movement of an article moving along the corresponding track portion and out of said path of movement, each of said first feeler means being operatively connected to one another and to said first guiding means and each of said second feeler means being operatively connected to one another and to said second guiding means in a sense such that movement of one feeler means from operative to inoperative position is effective to shift the associated guiding means from one operative position to another and to move the other associated feeler means from inoperative to operative position, the spacing of said first and second feeler means along each of said first and second output track portions respectively corresponding to the spacing between said first and second guiding means at said diverging station.

3. A conveyor comprising an input track portion along which a succession of articles are adapted to pass, first and second output track portions communicating with said input track portion and extending along different paths from a diverging station on said input track portion, said articles being adapted to pass from said input track portion to one or the other of said output track portions, first and second article guiding means at said diverging station and spaced from one another in a direction generally toward said output track portions, said second guiding means being closer to said output track portions than is said first guiding means, each of said guiding means being adapted to be engaged by and to guide said articles as they pass from said input track portion to one of said output track portions and each being movable between first and second operative positions oriented toward said first and second output track portions respectively, thereby to guide said articles into the output track portion toward which they are oriented, and control means for said guiding means, said control means being effective first to shift said first guiding means from first operative position to second operative position or vice versa, and thereafter to correspondingly shift said second guiding means as a guided article sequentially clears said first and second guiding means respectively.

4. The conveyor of claim 3, in which said control means for said first and second guiding means comprises first and second feeler means in said first and second output track portions respectively, sequentially spaced therealong, and movable between operative and inoperative positions in which they are respectively in the path of movement of an article moving along the corresponding track portion and out of said path of movement, each of said first feeler means being operatively connected to one another and to said first guiding means and each of said second feeler means being operatively connected to one another and to said second guiding means in a sense such that movement of one feeler means from operative to inoperative position is effective to shift the associated guiding means from one operative position to another and to move the other associated feeler means from inoperative to operative position, the spacing of said first and second feeler means along each of said first and second output track portions respectively corresponding to the spacing between said first and second guiding means at said diverging station.

5. A conveyor comprising an input track portion along which a succession of articles are adapted to pass, first and second output track portions communicating with said input track portion and extending along different paths from a diverging station on said input track portion, said articles being adapted to pass from said input track portion to one or the other of said output track portions, first and second article guiding means at said diverging station and spaced from one another in a direction generally toward said output track portions, said second guiding means being closer to said output track portions than is said first guiding means, each of said guiding means being adapted to be engaged by and to guide said articles as they pass from said input track portion to one of said output track portions and each being movable between first and second operative positions oriented toward said first and second output track portions respectively, thereby to guide said articles into the output track portion toward which they are oriented, and control means for said guiding means, said control means being sensitive to the passage of an article along said first and second output track portions respectively and effective first to shift said first guiding means from first operative position to second operative position or vice versa, and thereafter to correspondingly shift said second guiding means as a guided article sequentially clears said first and second guiding means respectively and as said article passes along said output track portions respectively.

6. The conveyor of claim 5, in which said control means for said first and second guiding means comprises first and second feeler means in said first and second output track portions respectively, sequentially spaced therealong, and movable between operative and inoperative positions in which they are respectively in the path of movement of an article moving along the corresponding track portion and out of said path of movement, each of said first feeler means being operatively connected to one another and to said first guiding means and each of said second feeler means being operatively connected to one another and to said second guiding means in a sense such that movement of one feeler means from operative to inoperative position is effective to shift the associated guiding means from one operative position to another and to move the other associated feeler means from inoperative to operative position, the spacing of said first and second feeler means along each of said first and second output track portions respectively corresponding to the spacing between said first and second guiding means at said diverging station.

References Cited by the Examiner
UNITED STATES PATENTS
2,873,836   2/1959   Stubblefield _____ 193—36
FOREIGN PATENTS
63,896   9/1927   Sweden.

EVON C. BLUNK, *Primary Examiner.*
RICHARD E. AEGERTER, *Examiner.*